(12) United States Patent
Mighton et al.

(10) Patent No.: US 10,370,278 B2
(45) Date of Patent: Aug. 6, 2019

(54) SUBMERGED COMBUSTION MELTER WITH VIBRATION DAMPING

(71) Applicant: OCV Intellectual Capital, LLC, Toledo, OH (US)

(72) Inventors: Steven James Mighton, Granville, OH (US); William Wyatt Toth, Newark, OH (US); Alvin Lee Miller, Newark, OH (US); Bruno Andre Purnode, Newark, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 91 days.

(21) Appl. No.: 15/572,517

(22) PCT Filed: Jun. 24, 2016

(86) PCT No.: PCT/US2016/039182
§ 371 (c)(1),
(2) Date: Nov. 8, 2017

(87) PCT Pub. No.: WO2016/210231
PCT Pub. Date: Dec. 29, 2016

(65) Prior Publication Data
US 2018/0155229 A1    Jun. 7, 2018

Related U.S. Application Data

(60) Provisional application No. 62/185,027, filed on Jun. 26, 2015.

(51) Int. Cl.
*C03B 5/167* (2006.01)
*C03B 5/235* (2006.01)
*C03B 5/42* (2006.01)

(52) U.S. Cl.
CPC ............ *C03B 5/167* (2013.01); *C03B 5/2356* (2013.01); *C03B 5/42* (2013.01); *C03B 2211/23* (2013.01); *C03B 2211/40* (2013.01)

(58) Field of Classification Search
CPC ..... C03B 5/167; C03B 5/1672; C03B 5/2356; C03B 5/42
See application file for complete search history.

(56) References Cited

U.S. PATENT DOCUMENTS 3,998,440 A * 12/1976 Atkinson .................. C21C 5/50
266/245
4,668,271 A * 5/1987 Goode ...................... C03B 3/02
65/137

(Continued)

FOREIGN PATENT DOCUMENTS

| EP | 2397446 | 12/2011 |
|---|---|---|
| EP | 2578547 | 4/2013 |
| WO | 2015/014917 | 2/2015 |

OTHER PUBLICATIONS

Office Action from European Application No. 16736339.9 dated Dec. 20, 2018.

(Continued)

*Primary Examiner* — Jason L Lazorcik
(74) *Attorney, Agent, or Firm* — Calfee, Halter & Griswold LLP

(57) ABSTRACT

A submerged combustion melting system (90) includes a submerged combustion melter (100) having a housing (102) that defines a melting chamber (104) and one or more vibration damping devices (340) operatively coupled to the housing (102).

10 Claims, 2 Drawing Sheets

(56) References Cited

U.S. PATENT DOCUMENTS

| | | | | |
|---|---|---|---|---|
| 4,668,272 | A * | 5/1987 | Newcamp | C03B 3/02 65/335 |
| 4,676,819 | A * | 6/1987 | Radecki | C03B 3/02 65/134.7 |
| D465,022 | S * | 10/2002 | Stansbury | D23/386 |
| 8,882,075 | B2 * | 11/2014 | Stansbury | C07C 335/26 248/188.1 |
| 2003/0172856 | A1 | 9/2003 | Hoffmann et al. | |
| 2005/0268663 | A1 * | 12/2005 | Tomita | C03B 5/16 65/374.12 |
| 2013/0086950 | A1 * | 4/2013 | Huber | C03B 5/167 65/134.5 |
| 2013/0086952 | A1 * | 4/2013 | Charbonneau | C03B 37/06 65/377 |
| 2016/0159675 | A1 * | 6/2016 | Demott | C03B 5/183 65/540 |
| 2016/0159676 | A1 * | 6/2016 | Demott | C03B 5/12 432/13 |
| 2016/0168001 | A1 * | 6/2016 | Demott | C03B 5/12 65/482 |
| 2016/0185642 | A1 * | 6/2016 | Demott | C03B 5/183 65/134.5 |
| 2016/0207814 | A1 * | 7/2016 | Demott | C03B 5/005 |
| 2017/0074590 | A1 * | 3/2017 | Baker | F27D 99/00 |
| 2017/0368584 | A1 * | 12/2017 | Demott | C03C 1/002 |
| 2018/0009693 | A1 * | 1/2018 | Demott | C03B 5/2353 |
| 2018/0022628 | A1 * | 1/2018 | Demott | C03C 13/06 65/474 |
| 2018/0022629 | A1 * | 1/2018 | Demott | C03B 5/12 65/475 |
| 2018/0339927 | A1 * | 11/2018 | Demott | C03B 5/12 |

OTHER PUBLICATIONS

International Search Report and Written Opinion from PCT/US16/039182 dated Sep. 19, 2016.

* cited by examiner

SUBMERGED COMBUSTION MELTER WITH VIBRATION DAMPING

RELATED APPLICATIONS

This application is the U.S. national stage entry of PCT/US2016/039182, filed Jun. 24, 2016, which claims priority to and all benefit of U.S. Provisional Patent Application Ser. No. 62/185,027, filed on Jun. 26, 2015, for SUBMERGED COMBUSTION MELTER WITH VIBRATION DAMPING, the entire disclosures of which are fully incorporated herein by reference.

FIELD

The general inventive concepts relate generally to submerged combustion melter systems for producing molten glass and, more particularly, to submerged combustion melter systems with vibration damping.

BACKGROUND

The use of submerged combustion to melt glass is known in the glassmaking industry. In submerged combustion, combustion gases are injected beneath the surface of a molten pool of glass and are permitted to percolate upwardly through the melt. An advantage of such an approach is that the materials being heated are in intimate contact with the combustion gases thereby yielding efficient heat exchange rates. Another advantage is that the injection of the gases into the melt produces a high degree of stirring which can be beneficial in some melting processes. Notwithstanding these potential advantages, submerged combustion has a drawback in that the volatility of the submerged combustion process may result in significant vibration of the melter that can lead to fatigue of system components.

SUMMARY

The general inventive concepts contemplate systems and methods for damping vibration of a submerged combustion melter.

In one exemplary embodiment, a system includes a submerged combustion melter having a housing that defines a melting chamber and one or more vibration damping devices operatively coupled to the housing to damp the vibration of the melter during operation. In one exemplary embodiment, the system includes a plurality of vibration damping devices operatively coupled to the housing.

In one exemplary embodiment, the length of the housing is greater than the width of the housing, and a majority of the plurality of vibration damping devices are arranged to damp vibration in a direction traverse to the length.

In one exemplary embodiment, at least one of the vibration damping devices utilize dry friction damping and apply a substantially constant damping force over the entire stroke length of the device.

Other aspects, advantages, and features of the general inventive concepts will become apparent to those skilled in the art from the following detailed description, when read in light of the accompanying drawings.

BRIEF DESCRIPTION OF THE DRAWINGS

For a fuller understanding of the nature and advantages of the general inventive concepts, reference should be had to the following detailed description taken in connection with the accompanying drawings, in which.

DETAILED DESCRIPTION

Figure 1:
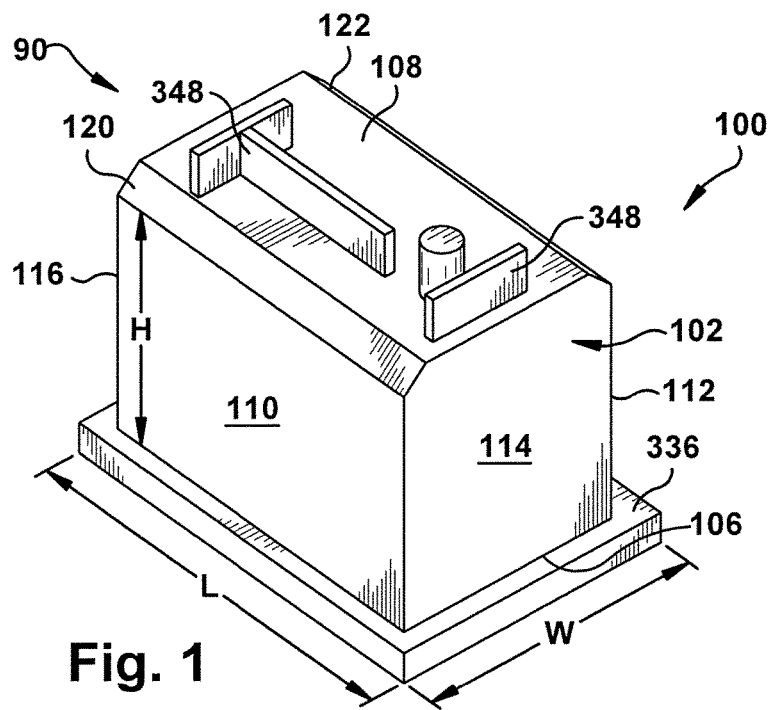
FIG. 1 is a partial perspective view of an exemplary embodiment of a submerged combustion melting system.

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

Unless otherwise defined, the terms used herein have the same meaning as commonly understood by one of ordinary skill in the art encompassing the general inventive concepts. The terminology used herein is for describing exemplary embodiments of the general inventive concepts only and is not intended to be limiting of the general inventive concepts. As used in the description of the general inventive concepts and the appended claims, the singular forms "a," "an," and "the" are intended to include the plural forms as well, unless the context clearly indicates otherwise.

Figure 2:
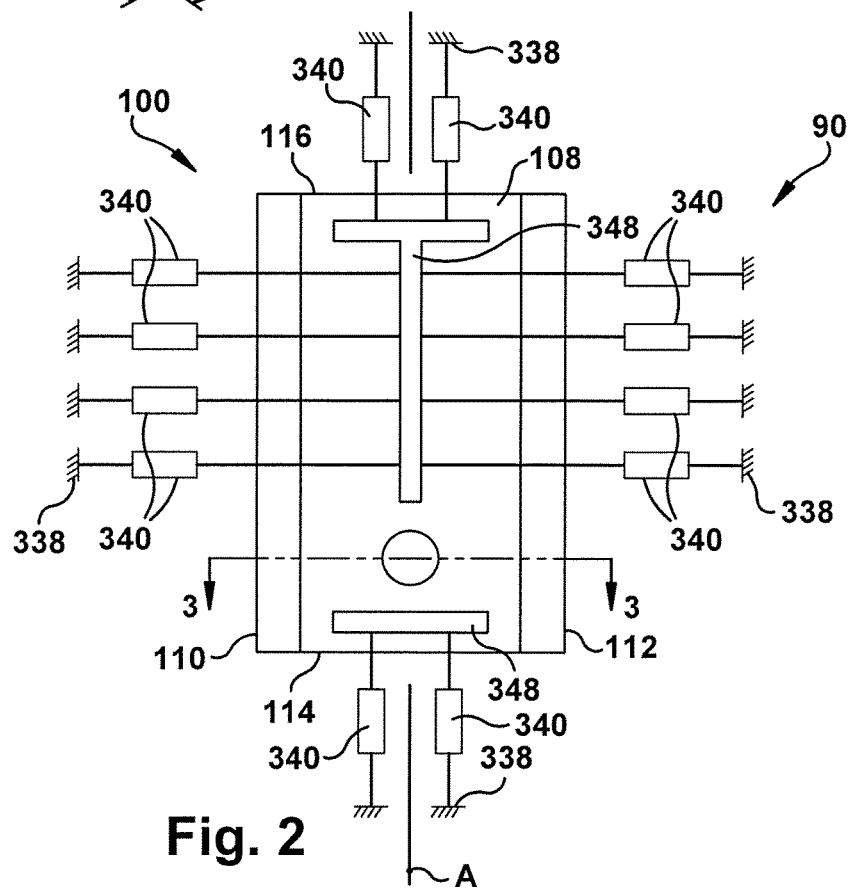
FIG. 2 is a top view of the submerged combustion melting system of FIG. 1 with vibration damping devices shown in schematic.
Figure 3:
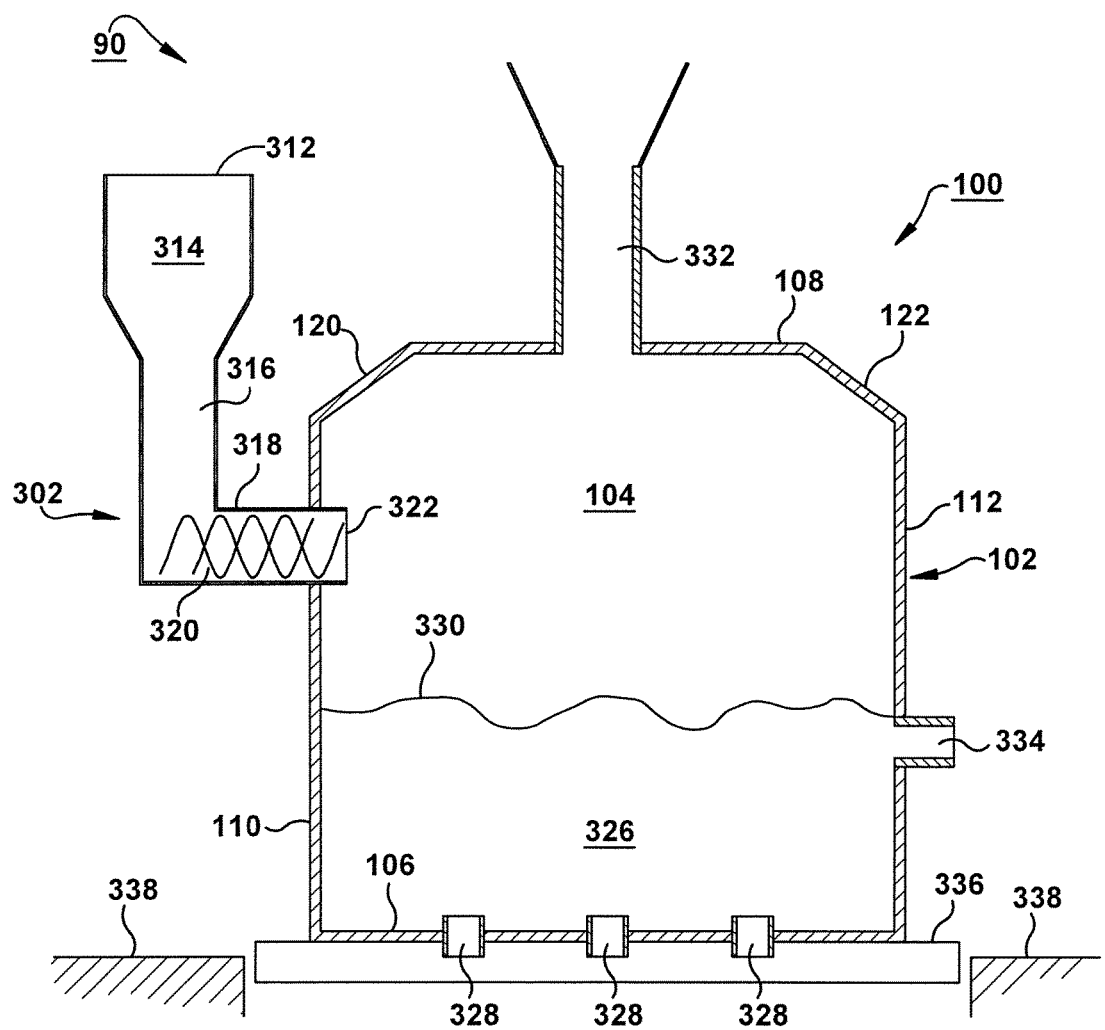
FIG. 3 is a cross-sectional view of a submerged combustion melter along line 3-3 of FIG. 2.

Referring now to the drawings, FIGS. 1-3 illustrate an exemplary embodiment of a submerged combustion melting system 90. The system 90 includes a melter 100 having a hollow housing 102 that defines a melt chamber 104 (see FIG. 3). The housing 102 may be formed in a variety of ways, such as for example different shapes and sizes. In the illustrated exemplary embodiment, the housing 102 is generally box-shaped. The housing 102 includes a floor 106 and a roof 108 spaced apart from and generally parallel to the floor. The housing 102 also includes a first sidewall 110 extending between the floor and the roof, a second sidewall 112 spaced apart from the first sidewall and extending between the floor and the roof, a third sidewall 114 extending between the first and second sidewalls 110, 112, and a fourth sidewall 116 extending between the first and second sidewalls 110, 112. The first sidewall 110 includes a first tapered portion 120 adjacent the roof 108, and the second sidewall 112 includes a second tapered portion 122 adjacent the roof 108 and opposite the first tapered portion.

The sidewalls 110, 112, 114, 116, the floor 106, and/or the roof 108 may be made of any materials suitable to withstand the environment inside the melter 100. In one exemplary embodiment, the sidewalls 110, 112, 114, 116, the floor 106, and/or the roof 108 are water-cooled steel walls. In one exemplary embodiment, the sidewalls 110, 112, 114, 116, the floor 106, and/or the roof 108 include refractory material attached to or otherwise interfaced with an inner surface thereof. In the exemplary embodiment of FIGS. 1-3, the housing 102 has a width W, a length L, and a height H. In the illustrated exemplary embodiment, the length L is greater than the width W, and the length extends along a longitudinal axis A (FIG. 2).

Referring to FIG. 3, glass making materials (e.g., raw materials) are delivered to the melt chamber 104 of the melter 100 by a feeding system 302. The exemplary feeding system 302, as shown in FIG. 3, includes an inlet opening 312, a bin 314, a chute 316, a screw shaft 318, a screw feeder 320 disposed within the screw shaft 318, and an outlet opening 322. The feeding system 302 is primarily located adjacent and external to the melter 100, with only a portion of the screw shaft 318 extending into the melt chamber 104 (e.g., through one of the side walls 110, 112, 114, 116). In this manner, the outlet opening 322 of the feeding system 302 is disposed within the melter 100 such that the raw materials can be delivered into the melt chamber 104. Thus, the screw shaft 318 functions as a conduit for the raw materials to enter the melter 100.

In operation, the raw materials are first placed in the bin 314 through the inlet opening 312 of the feeding system 302. In one exemplary embodiment, the raw materials are placed in the bin 314 manually. In one exemplary embodiment, the raw materials enter the bin 314 via an automated delivery system (not shown).

As the raw materials enter the bin 314, they travel down the chute 316 (e.g., due to gravity), and collect behind the screw shaft 318. The screw feeder 320 rotates within the screw shaft 318 to pull or otherwise move the raw materials from the chute 316 and through the screw shaft 318. As the raw materials are carried past the screw feeder 320, they exit the screw shaft 318 through the outlet opening 322 and fall down into or otherwise enter the melt chamber 104 where they are processed (i.e., melted).

During operation of the melter 100, the raw materials will enter the melt chamber 104 and typically come to rest on a top surface 330 of molten glass 326 within the melter 100. In this manner, the raw materials become mixed in with the molten glass 326 and are melted to increase an amount of the molten glass 326 in the melter 100. The rate at which the amount of the molten glass 326 in the melter 100 is increased can be controlled, at least in part, by varying the rate at which the raw materials are fed to the melt chamber 104 by the feeding system 302.

Furthermore, since operation of the screw feeder 320 removes or otherwise reduces the raw materials that have accumulated in the chute 316 and/or the bin 314 at a measurable or predictable rate, additional raw materials may be added to the feeding system 302 periodically to replenish those being fed into the melt chamber 104. In one exemplary embodiment, additional raw materials are added to the feeding system 302 in accordance with a set schedule. In one exemplary embodiment, additional raw materials are added to the feeding system 302 in accordance with feedback from a control system (not shown). Thus, with a continuous supply of the raw materials available, continuous operation of the melter 100 (i.e., continuous production of the molten glass 326) is possible.

To melt the raw materials carried into the melt chamber 104 by the feeding system 302 and thereby form molten glass 326, the melter 100 uses submerged combustion. Accordingly, a plurality of submerged combustion burners 328 extend through the floor 106 of the melter 100. As used herein, the phrase "submerged combustion burners" refers to burners configured so that the flames generated from the burners, and/or the combustion gases resulting from the flames, develop below and/or within the actual mass of the raw materials being melted. Generally, submerged combustion burners 328 are positioned to be flush with, or project slightly from, the floor 106 of the melter 100. In one exemplary embodiment, the burners 328 are positioned to be flush with, or project slightly from, one or more of the sidewalls 110, 112, 114, 116. In one exemplary embodiment, the burners 328 are positioned to be flush with, or project slightly from, the floor 106 and one or more of the sidewalls 110, 112, 114, 116.

In the submerged combustion burners 328, a mixture of fuel and oxidant, also referred to as a fuel-oxidant mixture, is ignited to initiate combustion, and the generated combustion products are introduced directly into a volume of the raw materials being melted. Constant, reliable, and rapid ignition of the fuel-oxidant mixture is provided while a stable flame is maintained beneath the surface 330 of the molten glass 326 such that the mixture burns quickly and releases the heat of combustion directly into the molten glass 326.

Sensors (not shown) or related devices can be used to measure characteristics of the burners 328 during operation. In one exemplary embodiment, a pressure gauge is attached to the fuel line of each burner 328 so that a pressure applied to the burner by the molten glass 326 in which it is submerged can be measured.

The burners 328 are capable of firing gaseous and liquid fuels, alone or in combination, including, but not limited to, natural gas, liquefied low-BTU gas, waste gas, hydrogen, hydrogen-enriched fuel gas, other combustible gases, and fuel oil of various compositions. In one exemplary embodiment, the fuels are gaseous fuels. Examples of suitable oxidants include oxygen, oxygen-enriched air (up to 80% oxygen), air (which contains 21% oxygen), or any gas containing oxygen. The burners 328 can be operated in both fuel-lean and fuel-rich modes, thereby providing either an oxidizing or reducing atmosphere.

The burners 328 heat a batch of glass forming raw materials to melt the raw materials and form the molten glass 326. Gas bubbles released from the burners 328 increase the circulation of the molten glass 326 within the melt chamber 104. In one exemplary embodiment, the burners 328 are oxygen-fuel burners configured to maintain the temperature in the melter 100 within the range of from about 2,200 degrees F. to about 3,000 degrees F. It will be understood that the temperature within the melter 100 will be determined based on the melting temperature of the glass and other material to be melted. Accordingly, the burners 328 may be configured to maintain the temperature in the melter 100 at any desired level, including below about 2,200 degrees F. and above about 3,000 degrees F. Furthermore, other types of burners may be used, such as air-gas burners.

The submerged combustion burners 328 supply energy to the raw materials and other glass constituents being melted in the form of thermal energy (heat release) and mechanical energy (injection of the fuel-oxidant mixture). Simultaneously, well-mixed or homogeneous molten glass 326 is created from the action of the combustion products within the raw materials being melted. The well-mixed or homogeneous molten glass 326 is achieved by injection of high-momentum jets of the combustion products into the molten glass 326, which improves the homogeneity of the molten glass 326 and the quality of the final product. As used herein, "high-momentum" refers to momentum sufficient to overcome the liquid pressure, to create a desired mixing pattern in the melt, and to create forced upward travel of the flame and combustion products.

Submerged combustion provides enhanced mixing, higher shear forces, and more direct heat transfer from the submerged combustion burners 328 to the high-temperature molten glass 326, as compared to conventional melting systems and methods. This results in faster and more complete melting of the raw materials, while minimizing temperature gradients in the molten glass 326. The result is a more efficient process that produces the high temperature molten glass.

Byproducts of the submerged combustion process, including gaseous inclusions escaping the molten glass 326, can leave the melt chamber 104 of the melter 100 via an exhaust duct 332. In one exemplary embodiment, the exhaust duct 332 is formed in the roof 108 of the melter 100. In one exemplary embodiment, if any of the raw materials entering the melt chamber 104 via the feeding system 302 are drawn into the exhaust duct 332, they may be recycled or otherwise reclaimed. For example, a baghouse (not shown) may be used to recycle the escaping raw materials.

The melter 100 also includes a molten glass outlet 334. The molten glass outlet 334 is used to carry or otherwise deliver the molten glass 326 out of the melter 100 for further processing. For example, the molten glass 326 produced in the melter 100 can leave the melter 100 via the molten gas outlet 334 and travel downstream to a refining apparatus/station (not shown) and/or a glass production (e.g., fiberization) apparatus/station (not shown). In one exemplary embodiment, the molten glass outlet 334 is formed in one of the sidewalls 110, 112, 114, 116. In one exemplary embodiment, the molten glass outlet 334 is formed in the second sidewall 112, and the screw shaft 118 extends through the first sidewall 110.

As noted above, the sidewalls 110, 112, 114, 116, the floor 106, and/or the roof 108 of the melter 100 are typically cooled, such as by a fluid. Such fluid-cooled walls may increase the operational life of the walls. Furthermore, these cooled walls are known to create a frozen glass layer (not shown) along the inside surfaces of the walls which is beneficial because it minimizes corrosive interaction between the molten glass 326 and the refractory material of the walls. The frozen glass layer is generally formed at least around the volume of the molten glass 326, including on the sidewalls 110, 112, 114, 116, below the surface 330 of the molten glass 326, and on the floor 106 of the melter 100.

Given the nature of the submerged combustion process, the submerged combustion melter 100 can generate a great deal of vibration and related movement of the melter. For example, in one embodiment, the melter 100 may generate low amplitude vibrations (e.g, below ½ inch) and operate for extended periods of time (i.e., high number of cycles). As a result, the continual vibrations can cause premature failure of melter components and undesired vibration in nearby areas. As such, the melter 100 may include one or more systems to damp the vibration of the melter and reduce the negative impact of the vibration on system components, connections, and nearby areas and systems.

In one exemplary embodiment, the melter 100 is mounted onto an isolated surface or platform 336. The isolated surface 336 may be configured in a variety of ways. Any surface that can support the melter 100 and moves with the melter, such as for example, with the vibration of the melter, may be used. The isolated surface 336 and the melter 100 move relative to a base surface or structure 338. The base surface or structure 338, for example, may support systems external to the melter 102, such as an automated delivery system (not shown) for delivery of raw material to the opening 312 in the bin 314 or piping or electronics for supporting the melter 102.

In one exemplary embodiment, one or more vibration damping devices 340 may be associated with the system 90. The one or more vibration damping devices 340 may be configured in a variety of ways. For example, the number of devices, the location and orientation of the devices, the type of vibration damping, and the mechanism used by the devices for damping vibration may vary in different embodiments.

Figure 4:
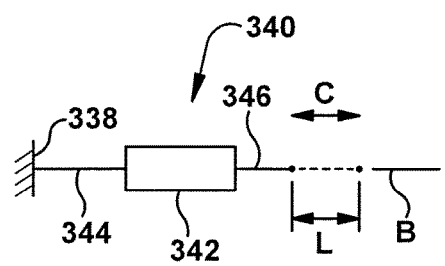
FIG. 4 is a schematic illustration of an exemplary embodiment of a vibration damping device.

Referring to FIG. 4, a schematic representation of an exemplary embodiment of a vibration damping device 340 is illustrated. The vibration damping device 340 may include a body portion 342, a first connection portion 344 fixably attached to the body portion 342, and a second connection portion 346 movable connected to the body portion 342. The vibration damping device 340 may extend along a longitudinal axis B. The vibration damping device 340 can be configured to attach, via the first and second connection portions 344, 346, to two separate objects or surfaces, such as for example, the melter 102 and the base surface 338, to damp relative movement between the two objects or surfaces. In the illustrated embodiment, the first connection portion 344 is attached to the base surface 338, and the second connection portion 346 is connected to the melter 102. In other embodiments, however, the first connection portion 344 may be attached to the melter 102, and the second connection portion 346 may be connected to the base surface 338.

In one embodiment, the vibration damping device 340 damps linear movement along the axis B. For example, as shown by arrow C in FIG. 4, the second connection portion 346 moves in and out of the body portion 342. In operation, the distance the second connection portion 346 moves relative to the body portion 342 is referred to as the stroke length L of the vibration damping device 340. The vibration damping device 340 can be configured such that damping force of the device is applied to any movement of the second connection portion 346 relative to the body portion 342 (i.e., over the entire stroke length), and the force may be constant, or substantially constant, over the stroke length. In one exemplary embodiment, in operation, the stroke length L of the vibration damping device 340 is less than 1 inch. In another embodiment, the stroke length L of the vibration damping device 340, in operation, is in the range of ⅛ inch to ½ inch, or about ⅛ inch to about ½ inch. In yet another embodiment, the stroke length L of the vibration damping device 340, in operation, is in the range of ¼ inch to ⅜ inch, or about ¼ inch to about ⅜ inch.

In the illustrated embodiment of FIGS. 1-3, the system 90 includes twelve (12) vibration damping devices 340. In other embodiments, however, the system 90 may include more than or less than twelve (12) vibration damping devices. In the illustrated embodiment, eight (8) vibration damping devices are operatively connected to the melter 100 in a direction traverse to the longitudinal axis A and parallel to, or generally parallel to, the isolated surface 336. In one embodiment, the eight (8) vibration damping devices are operatively connected to the melter 100 in a direction perpendicular to, or generally perpendicular to, the longitudinal axis A. A remaining four (4) vibration damping devices are operatively connected to the melter 100 in a direction parallel to, or generally parallel to, the longitudinal axis A and parallel to, or generally parallel to, the isolated surface 336. In other embodiments, however, the orientation of one or more of the vibration damping devices may be other than perpendicular or parallel to the longitudinal axis A and other than parallel to the isolated surface 336.

In one exemplary embodiment, the length L of the housing 102 is greater than the width W, and the system 90 includes more vibration damping devices 340 arranged traverse to the longitudinal axis A than arranged parallel, or generally parallel to, the longitudinal axis A. In other words, more vibration damping devices 340 are arranged to damp side-to-side or rocking movement of the shorter side of the melter 102 than side-to-side or rocking movement of the longer side of the melter.

The vibration damping devices 340 may be operatively coupled to the melter 102 in a variety of ways. Any coupling that allows the vibration damping devices to reduce the vibration of the melter may be used. In one exemplary embodiment, the second connection portion 346 is attached to the melter, and a first connection portion 344 is attached to a stationary surface, such as for example, the base surface 338 or a structure connected to the base surface. The first connection portion 344 and the second connection portion 346 may be fixably attached, pivotably attached, rotatably attached, or other suitable attachment, to the base surface 338 and the melter 102, respectively.

In one exemplary embodiment, one or more of the vibration damping devices 340 are attached to one or more of the sidewalls 110, 112, 114, 116, the roof 108, or the floor 106 of the melter 102. In one embodiment, the melter 102 may include one or more projections 348 extending from one or more of the sidewalls 110, 112, 114, 116, the roof 108, or the floor 106 to which one or more of the vibration damping devices may attach. In the illustrated embodiment of FIGS. 1-3, the melter 102 includes a projection 348 extending from the roof 108 to which one or more of the vibration damping device 340 attaches.

The vibration damping devices 340 may be configured to damp the vibration of the melter 120 by any suitable damping method or mechanism. In one exemplary embodiment, the vibration damping devices 340 apply a damping force linearly in the direction that the vibration damping devices are mounted (e.g., the eight (8) vibration damping devices that extend perpendicular, or generally perpendicular to, the longitudinal axis A in FIG. 2 apply a damping force in a direction perpendicular to, or generally perpendicular to, the longitudinal axis A). The vibration damping devices 340, thus, may damp reciprocating linear motion of the melter 102. In one exemplary embodiment, the vibration damping devices 340 utilize Coulomb (dry friction) damping to convert movement of the melter (kinetic energy) into friction generated heat energy through the rubbing of two surfaces within each vibration damping devices. In one embodiment, each of the vibration damping devices provides a damping force that is constant in magnitude and in the opposite direction of linear motion of the melter. The damping force is applied to even small movements of the melter, such as low amplitude vibration.

In one exemplary embodiment, the magnitude of damping force in each of the vibration damping devices 340 is adjustable. For example, the amount of friction between two surfaces rubbing within each of the vibration damping devices may be modified. In one exemplary embodiment, the magnitude of damping force of the vibration damping device 340 is adjustable in the range of 25 pounds to 250 pounds, or about 25 pounds to about 250 pounds. In another exemplary embodiment, the magnitude of damping force of the vibration damping device 340 is adjustable in the range of 50 pounds to 100 pounds, or about 50 pounds to about 100 pounds.

The above description of specific embodiments has been given by way of example. From the disclosure given, those skilled in the art will not only understand the general inventive concepts and their attendant advantages, but will also find apparent various changes and modifications to the structures and concepts disclosed. For example, although the illustrated embodiments described herein utilize dry friction-style dampers, the general inventive concepts are applicable to any vibration damping device that is capable of damping vibration of the melter while it is in an operational state. It is sought, therefore, to cover all such changes and modifications as fall within the spirit and scope of the general inventive concepts, as defined herein and by the appended claims, and equivalents thereof.

We claim:

1. A submerged combustion melting system comprising:
a submerged combustion melter having a housing that defines a melting chamber, the housing having a longitudinal axis; and
a plurality of vibration damping devices operatively coupled to the housing to damp the vibration of the melter during operation, wherein at least one of the plurality of vibration damping devices is arranged to damp vibration in the direction of the longitudinal axis and at least another one of the plurality of vibration damping devices is arranged to damp vibration transverse to the longitudinal axis.

2. The submerged combustion melting system of claim 1, wherein the housing has a length extending along the longitudinal axis and a width, and wherein the length is greater than the width and a majority of the plurality of vibration damping devices extend in a direction traverse to the longitudinal axis.

3. The submerged combustion melting system of claim 2, wherein the majority of the plurality of vibration damping devices extend generally perpendicular to the longitudinal axis.

4. The submerged combustion melting system of claim 2, wherein at least twice as many vibration damping devices extend in a direction traverse to the longitudinal axis as extend in a direction parallel to the longitudinal axis.

5. The submerged combustion melting system of claim 1, wherein one or more of the plurality of vibration damping devices are dry friction damping devices.

6. The submerged combustion melting system of claim 1, further comprising at least one projection extending from a roof of the housing.

7. The submerged combustion melting system of claim 6, wherein at least one of the plurality of vibration damping devices is operatively coupled to the projection.

8. The submerged combustion melting system of claim 1, wherein a magnitude of the damping force for each of the plurality of vibration dampers is adjustable.

9. The submerged combustion melting system of claim 8, wherein the magnitude of the damping force for each of the plurality of vibration dampers is adjustable in the range of about 50 pounds to about 100 pounds.

10. The submerged combustion melting system of claim 1, wherein the plurality of damping devices, in operation, each have a stroke length of less than ½ inch and apply a damping force over substantially the entire stroke length.

* * * * *